W. H. LEHMAN.
TROLLEY WIRE COUPLING.
APPLICATION FILED SEPT. 13, 1918.
1,324,678.
Patented Dec. 9, 1919.
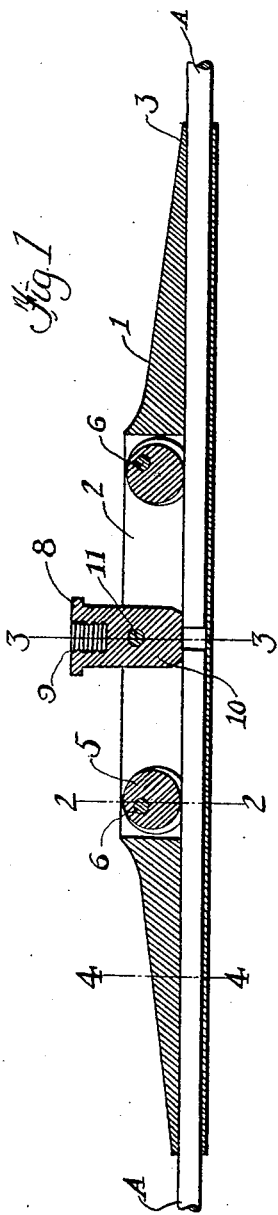
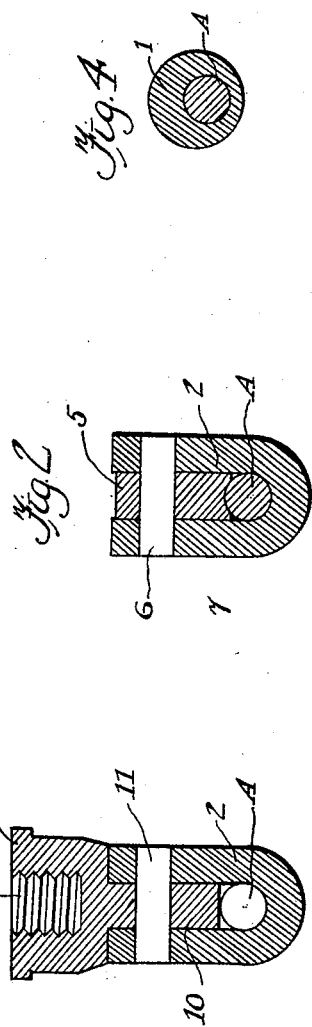
Witnesses
Inventor
W H Lehman
By Victor J. Evans.
Attorney

UNITED STATES PATENT OFFICE.

WILLIAM H. LEHMAN, OF PORTLAND, OREGON.

TROLLEY-WIRE COUPLING.

1,324,678.      Specification of Letters Patent.      Patented Dec. 9, 1919.

Application filed September 13, 1918. Serial No. 253,910.

*To all whom it may concern:*

Be it known that I, WILLIAM H. LEHMAN, a citizen of the United States, residing at Portland, in the county of Multnomah and State of Oregon, have invented new and useful Improvements in Trolley - Wire Couplings, of which the following is a specification.

This invention is an improved coupling for electric railway trolley wires and other wires, the object of the invention being to provide an improved device of this kind which is extremely simple in construction, which enables wires to be coupled without employment of any tools and in a very short time, which securely holds the wires coupled, which offers no obstructions to the trolley wheels and which can be readily suspended from the span wire support without the necessity of cutting the same.

With the above and other objects in view, the invention consists in the construction, combination and arrangement of devices hereinafter described and claimed.

In the accompanying drawings:

Figure 1 is a longitudinal sectional view of a trolley coupling constructed and arranged in accordance with my invention.

Fig. 2 is a transverse sectional view on the plane indicated by the line 2—2 of Fig. 1.

Fig. 3 is a similar view on the plane indicated by the line 3—3 of Fig. 1.

Fig. 4 is a similar view on the plane indicated by the line 4—4 of Fig. 1.

The coupling member 1 is cross sectionally U-shaped in its central portion 2 and is formed with tubular ends 3 which taper outwardly. The lower side of the central portion is rounded to correspond with the shape of the tubular end portions and the lower side of the coupling member is slightly arcuate from end to end as shown. Owing to this construction of the coupling member and the provision of the tapered end portions the coupling member offers no obstruction to the passage of the trolley wheels.

To secure the trolley wires *a* in the coupling member, I provide a pair of gripping cams 5 which are circular in form and which are arranged in the central portion of the coupling member and near the inner ends of the tubular end portions thereof and are eccentrically pivotally mounted as at 6. The under peripheral portions of the gripping cams are grooved as at 7 to receive and engage the trolley wires. The said cams by reason of their being eccentrically pivotally mounted, drop by their own gravity and hence when the trolley wires are inserted in the ends of the coupling member they are engaged by the said gripping cams and held thereby against outward movement so that the stronger the tension on the trolley wires the more tightly and effectually they will be held and gripped by and between the gripping cams and the lower side of the coupling member, as will be understood. Hence, there is no danger of the trolley wires becoming casually uncoupled.

In order to release the trolley wires from the coupling members it is only necessary to turn the gripping cams upwardly on their pivots and cause them to release the trolley wires when the latter can be then readily withdrawn from the coupling member.

In order to enable the coupling member to be suspended at a span support I provide a member 8 which has a screw threaded bore in its upper portion as at 9 and has a boss 10 at its lower end which is arranged to fit between the side walls of the coupling member, at the center thereof, and which is engaged by a pin 11, said pin passing through openings in said side walls and in the boss.

While I have herein shown and described a preferred embodiment of my invention, I would have it understood that changes may be made in the form, proportion and construction of the several parts without departing from the spirit of my invention and within the scope of the appended claim.

Having thus described my invention, I claim:

A trolley wire coupling comprising a member having hollow tubular end portions adapted to receive the terminals of the wires, and a U-shaped intermediate portion open at the top thereof, the closed end of the U-shaped portion being rounded, grooved cams eccentrically pivoted in said U-shaped portion adjacent the tubular ends, and a detachable boss fitted between the parallel sides of the U-shaped portion and having one end bridging the adjacent terminals of the wires.

In testimony whereof I affix my signature.

WILLIAM H. LEHMAN.